United States Patent [19]

Vartiak

[11] 4,300,861
[45] Nov. 17, 1981

[54] METHOD OF USING ADMIXTURE OF WATER-SOLUBLE POLYMERS IN LATEX FORM AND GYPSUM AS SEEPAGE CONTROL AGENTS

[75] Inventor: Joseph F. Vartiak, Naperville, Ill.

[73] Assignee: Nalco Chemical Company, Oak Brook, Ill.

[21] Appl. No.: 161,961

[22] Filed: Jun. 23, 1980

[51] Int. Cl.³ .............................................. E02B 3/02
[52] U.S. Cl. ..................................... 405/264; 405/270
[58] Field of Search ........... 166/293, 294, 295, 305 D; 264/31; 405/263, 264, 270

[56] References Cited

U.S. PATENT DOCUMENTS

| | | | |
|---|---|---|---|
| 3,219,112 | 11/1965 | Sauber et al. | 166/293 |
| 3,298,982 | 1/1967 | Glenn et al. | 405/264 X |
| 3,312,296 | 4/1967 | Paramore et al. | 166/293 X |
| 3,721,295 | 3/1973 | Bott | 166/294 X |
| 3,893,510 | 7/1975 | Elphingstone et al. | 166/294 X |
| 3,943,078 | 3/1976 | James | 405/264 X |
| 3,953,975 | 5/1976 | Busler et al. | 405/264 |

*Primary Examiner*—Stephen J. Novosad
*Assistant Examiner*—George A. Suchfield
*Attorney, Agent, or Firm*—John G. Premo; Robert A. Miller

[57] ABSTRACT

A method of sealing porous earthen surfaces which are in contact with ponded water which comprises treating the water in contact with such surfaces with the following composition:

| Ingredients | General Formula % by Weight |
|---|---|
| $CaSO_4$ | 50–80 |
| Latex Polymer (10–40% anionic water-soluble polymer) | 5–20 |
| Water | Balance |

The invention is particularly adapted to sealing soil which is in contact with acid mine waters.

8 Claims, No Drawings

METHOD OF USING ADMIXTURE OF WATER-SOLUBLE POLYMERS IN LATEX FORM AND GYPSUM AS SEEPAGE CONTROL AGENTS

INTRODUCTION

When water is ponded in contact with soil, a portion of the water is lost by seepage through the soil. To prevent seepage loss of ponded water, a variety of solutions have been proposed to solve this problem. Most of these solutions deal with the placement of water-impervious linings over the soil in contact with the ponded water. Such coatings usually comprise asphaltic materials, plastic sheeting, cement and the like. Most of these techniques are expensive and require that the water not be present when they are applied to the surface to be sealed.

It is common in mining areas, particularly where phosphate rock is mined, to pond water used in the mining and purification processes. In many instances these waters produce what is known as an acid mine water which has a pH of 1. These waters, if ponded against porous soil, permeate through such soil and produce a hazardous environment by contaminating natural water supplies such as well water, streams, rivers, and the like.

If it were possible to provide a chemical for sealing soil in contact with ponded water which would be inexpensive and capable of direct application to the water whereby it would be placed in sealing contact with the soil, an advance in the art would be afforded.

THE INVENTION

A method of sealing porous earthen surfaces which are in contact with ponded water which comprises treating the water in contact with such surfaces with the following compositions.

| General Formula | |
| --- | --- |
| Ingredients | % by Weight |
| $CaSO_4$ | 50–80 |
| Latex Polymer (10–40% anionic water-soluble polymer) | 5–20 |
| Water | Balance |

| Preferred Formula | |
| --- | --- |
| Ingredients | % by Weight |
| $CaSO_4$ | 60–70 |
| Latex Polymer (10–40% anionic water-soluble polymer) | 15–25 |
| Water | Balance |

In an alternate, less-preferred embodiment of the invention, porous earthen surfaces may be sealed by the method described above using as a composition, the following:

| General Formula | |
| --- | --- |
| Ingredients | % by Weight |
| $CaSO_4$ | 50–80 |
| Dry Anionic Water-soluble polymer | 0.5–6 |
| Water | Balance |

| Preferred Formula | |
| --- | --- |
| Ingredients | % by Weight |
| $CaSO_4$ | 60–70 |
| Dry Anionic Water-soluble polymer | 1.5–3 |
| Water | Balance |

COMPOSITION

Compositions of the type described above are utilized at a dosage of at least 10 lbs. per yard of soil to be treated with and preferred dosages being in the range of 15–25 lbs. per yard. They are applied in the form of an aqueous slurry to the ponded waters where they settle and coat the soil rendering it impervious or relatively so to the water.

THE LATEX POLYMERS (THE WATER-IN-OIL EMULSIONS OF WATER SOLUBLE VINYL ADDITION POLYMERS)

The water-in-oil emulsions of water soluble vinyl addition polymers useful in this invention contain four basic components. These components and their weight percentages in the emulsions are listed below:

A. Water soluble vinyl addition polymer:
 1. Generally from 5–60%;
 2. Preferably from 20–40%; and
 3. Most preferably from 25–35%;
B. Water:
 1. Generally from 20–90%;
 2. Preferably from 20–70%; and
 3. Most preferably from 30–55%;
C. Hydrophobic liquid:
 1. Generally from 5–75%;
 2. Preferably from 5–40%; and
 3. Most preferably from 20–30%; and
D. Water-in-oil emulsifying agent:
 1. Generally from 0.1–21%;
 2. Preferably from 1–15%;
 3. Most preferably from 1.2–10%.

It is also possible to further characterize the water-in-oil emulsions of water soluble vinyl addition polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

THE WATER SOLUBLE ANIONIC VINYL ADDITION POLYMERS

While a broad range of polymers may be used in the form of their water-in-oil emulsions, the invention specifically contemplates the utilization of anionic acrylamide polymers, e.g. polymers of acrylamide which contain at least 5% by weight of acrylamide and another anionic monomer such as an acrylic acid compound, e.g. sodium acrylate, styrene sulphonic acid, and the like. Particularly useful are homopolymers of acrylic acid such as the sodium polyacrylates.

When polymers of this type are employed in the practice of the invention, it is beneficial that they be present in the latex in amounts ranging between 10–40% by weight and, most preferably, 15–25% of the latex.

The molecular weight of these polymers should be at least 100,000 although it is customary and best results are achieved when the molecular weights are 1,000,000 or more.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S. called "Low Odor Paraffinic Solvent." Typical specifications of this material are set forth below in Table I.

TABLE I

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benezene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF WATER SOLUBLE VINYL ADDITION POLYMERS

The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of a water soluble vinyl addition monomer and adding this solution to one of the hydrocarbon oils described above. With the addition of a suitable water-in-oil emulsifying agent and under agitation, the emulsion is then subjected to free radical polymerization conditions and a water-in-oil emulsion of the water soluble vinyl addition polymer is obtained. It should be pointed out that the ingredients are chosen based upon the weight percentages given above and their compatability with each other. As to choice of free radical catalyst, these materials may be either oil or water soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described utilizing emulsifiers having HLB values of between 4–9.

PHYSICAL PROPERTIES OF THE WATER-IN-OIL EMULSIONS

The water-in-oil emulsions of the finely divided water-soluble polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, ie: pumpable.

THE INVERSION OF THE WATER-IN-OIL EMULSIONS OF THE WATER SOLUBLE VINYL ADDITION POLYMERS

The water-in-oil emulsions of the water-soluble polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019, hereinafter incorporated by reference. As stated in the Anderson reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on the polymer. Good inversion often occurs within the range of 1.0–10 percent based on polymer.

The preferred surfactants utilized to cause the inversion of the water-in-oil emulsion of this invention when the emulsion is added to water are hydrophillic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at columns 4 and 5.

As indicated, while the calcium sulfate in combination with the latex polymers in water provide a preferred composition for use in practicing my invention, it is possible to use other compositions utilizing dry polymers. In preparing these compositions, such may be done in two ways.

In the first mode, the dry polymer is physically admixed with the dry calcium sulfate and then just prior to use, added to the water under conditions of agitation whereby the polymer is solubilized and the calcium sulfate is placed into the water solution of the polymer as a slurry.

The alternate mode would be to first prepare the polymer solutions and then add thereto the calcium sulfate to form the slurry.

These compositions are used at the dosages previously specified. The dry anionic polymer used in this embodiment of the invention would be those anionic polymers discussed under the previous heading, "The Water Soluble Vinyl Addition Polymers."

EMBODIMENTS OF THE INVENTION

To illustrate a variety of compositions which illustrate the invention in its preferred embodiment and also several compositions which are not preferred embodiments of the invention. Table 2 is presented below:

TABLE II*

| Composition Number | CaSO$_4$ | Latex A | Latex B | H$_2$O | Remarks |
|---|---|---|---|---|---|
| | % by Wt. | % by Wt. | % by Wt. | | |
| 1. | 60% | 6.6% | | Balance | Keep from draining out |
| 2. | 6.43% | | 2.0% | Balance | Didn't invert too well in acid water |
| 3. | 80% | 10% | | Balance | At 16 lbs/yd$^2$ Fair as Sealant |
| 4. | 60% | 10% | | Balance | At 16 lbs/yd$^2$ Better than #3 as a Sealant |
| 5. | 70.5% | 14.7% | | Balance | Maybe used in Bldg. Ind. feels like puddle |
| 6. | 66.6% | 16.6% | | Balance | Test method done on 11/26/79 |
| 7. | 70% | 2% | | Balance | Poor, did not seal |
| 8. | 68% | 4% | | Balance | Some improvement, less seepage |
| 9. | 60% | 8% | | Balance | Fair, water-holding properties present |
| 10. | 60% | 12% | | Balance | Good properties in |

TABLE II*-continued sealant, work on making a slurry to be pumped

*All testing was done in columns w/acid H$_2$O pH1 w/approximately 16 lbs/yd$^2$ of slurry

| Latex A was prepared from | Latex B was prepared from |
|---|---|
| H$_2$O | 27.07 DI water |
| 8.6894 50% NaOH | 23.21 50% NaOH |
| .0049 Versene | 1.01 Sorbitan Monooleate |
| 1.1986 Sorbitan monooleate | .034 N,N-azobis isobutyronitirite |
| 0.0580 Vazo 64 | 20.42 Acrylic Acid |
| N,N-azobis isobutyronitrite | 28.26 Paraffin Oil |
| 24.8303 Paraffenic | |
| 18.86 Acrylamide | |
| .7168 Sorbitan monostearate | |
| 7.7258 Acrylic Acid | |
| .0315 Hydroxyacetic acid | |
| 1.670 Octyl phenal RX 14 mols of Ethylene Oxide | |

These charges polymerized as per U.S. Pat. No. 3,979,348 Examples I and II.

The above compositions were evaluated using the following test method: Two columns each with 60 gm. of soil as the base. Acid water of a pH 1 (H$_2$SO$_4$) was added to the top of soil in the columns to check if there was seepage. After check for seepage, 16 lbs/yd$^2$ (13.4 gm.) of CaSO$_4$, polymer was added on to of acid water so it will sink to the bottom. Second column, 8 lbs./yd$^2$ (6.72 gm.) of the CaSO polymer was also added on top to sink to bottom. The plugging of acid water took little time before the polymer inverted to form a seal. The 8 lbs./yd$^2$ seem not to cover all the soil surface and from this, there was some seepage. The 16 lbs./yd$^2$ held well and looked good for 5 days.

Having thus described my invention it is claimed as follows:

1. A method of sealing porous earthen surfaces which are in contact with ponded water comprising the addition of the following compositions:

| Ingredients | % by Weight |
|---|---|
| 1. Calcium sulfate | 50–80 |
| 2. Water-in-Oil latex polymer containing 10–40% by weight anionic water-soluble polymer | 5–20 |
| 3. Water | Balance | to water in contact with such surfaces.

2. The method of claim 1 wherein the amount of the composition used to treat the soil is at least 10 lbs per square yard.

3. The method of claim 1 wherein the water is an acid mine water having a pH of about 1.

4. The method of claim 1 where the anionic water-soluble polymer is an anionic acrylamide polymer.

5. The method of claim 1 wherein the anionic water-soluble polymer is an acrylic acid polymer.

6. A method of sealing porous earthen surfaces which are in contact with ponded water comprising the addition of the following preferred compositions:

| Ingredients | % by Weight |
|---|---|
| 1. Calcium sulfate | 60–70 |
| 2. Water-in-Oil latex polymer containing 10–40% by weight anionic water-soluble polymer | 15–25 |
| 3. Water | Balance | to water in contact with such surfaces.

7. A method of sealing porous earthen surfaces which are in contact with ponded water comprising the addition of the following compositions:

| Ingredients | % by Weight |
|---|---|
| 1. Calcium sulfate | 50–80 |
| 2. Dry anionic water-soluble polymer | 0.5–6 |
| 3. Water | Balance | to water in contact with such surfaces.

8. A method of sealing porous earthen surfaces which are in contact with ponded water comprising the addition of the following preferred compositions:

| Ingredients | % by Weight |
|---|---|
| 1. Calcium sulfate | 60–70 |
| 2. Dry anionic water-soluble polymer. | 1.5–3 |
| 3. Water | Balance | to water in contact with such surfaces.

* * * * *